United States Patent [19]

Park

[11] Patent Number: 4,823,859
[45] Date of Patent: Apr. 25, 1989

[54] WINDSHIELD PROTECTIVE DEVICE

[76] Inventor: Steve S. Park, 70 Woodcrest Dr., Syosset, N.Y. 11791

[21] Appl. No.: 131,568

[22] Filed: Dec. 11, 1987

[51] Int. Cl.$^4$ ............................................. B60J 3/02
[52] U.S. Cl. .................................. 160/370.2; 160/23.1; 160/262; 296/97.8; 296/97.9; 242/107
[58] Field of Search ............... 296/97 R, 97 C, 97 D, 296/97 F, 97 G, 142, 143, 95 C; 242/107; 160/23.1, 29, 41, 262, 370.2

[56] References Cited

U.S. PATENT DOCUMENTS

| | | | |
|---|---|---|---|
| 1,385,131 | 7/1921 | Horn | 160/262 |
| 1,406,499 | 2/1922 | Sanberg | 296/142 |
| 1,571,019 | 1/1926 | Lucas | 296/97 F |
| 1,621,972 | 3/1927 | Darby | 160/370.2 |
| 1,637,763 | 8/1927 | Clegg | 160/23.1 |
| 2,851,303 | 9/1958 | McQueen | 160/11 |
| 3,003,812 | 10/1961 | Haugland | 296/97 R |
| 3,410,601 | 11/1968 | Thompson | 296/95 C |
| 3,511,365 | 5/1970 | Dow | 296/97 R X |
| 4,528,232 | 7/1985 | Cliff | 296/97 R X |

FOREIGN PATENT DOCUMENTS

| | | | |
|---|---|---|---|
| 3428700 | 2/1986 | Fed. Rep. of Germany | 296/97 R |
| 2504070 | 10/1982 | France | 296/97 C |
| 244277 | 12/1925 | United Kingdom | 296/97 G |
| 1045160 | 10/1966 | United Kingdom | 296/97 F |

Primary Examiner—Dennis H. Pedder

[57] ABSTRACT

Apparatus for dispensing a shade along the inside of a windshield to block the rays of the sun. The shade is trapezoidal in shape to conform to the shape of the windshield. A free end of the shade is attached to a holder mounted by suction cups to one end of the windshield. As the housing with the shade rolled up within is moved across the windshield, the shade is dispensed and forced against the windshield by a resilient wiper. The housing is then secured to the other end of the windshield by suction cups.

6 Claims, 3 Drawing Sheets

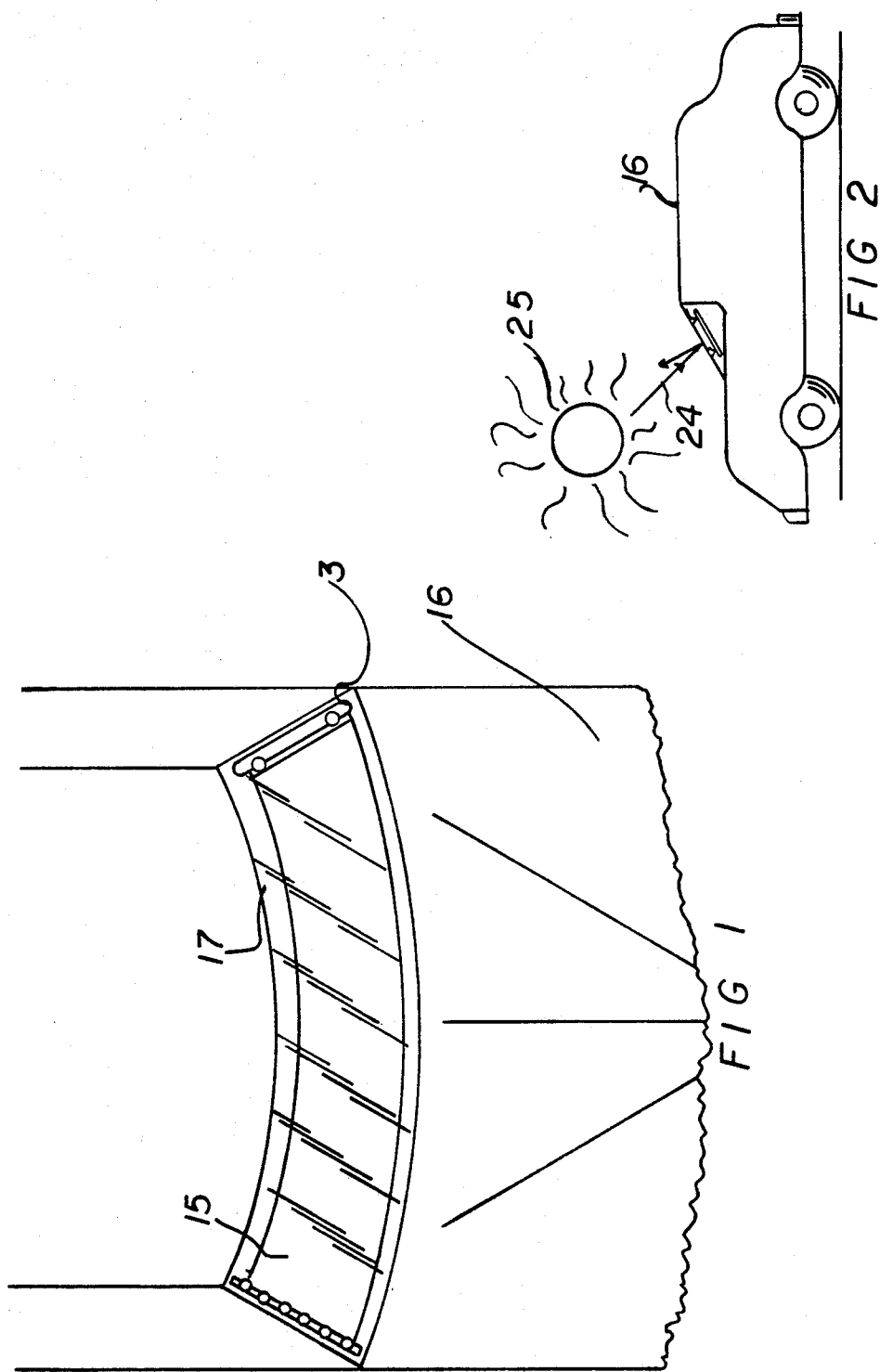

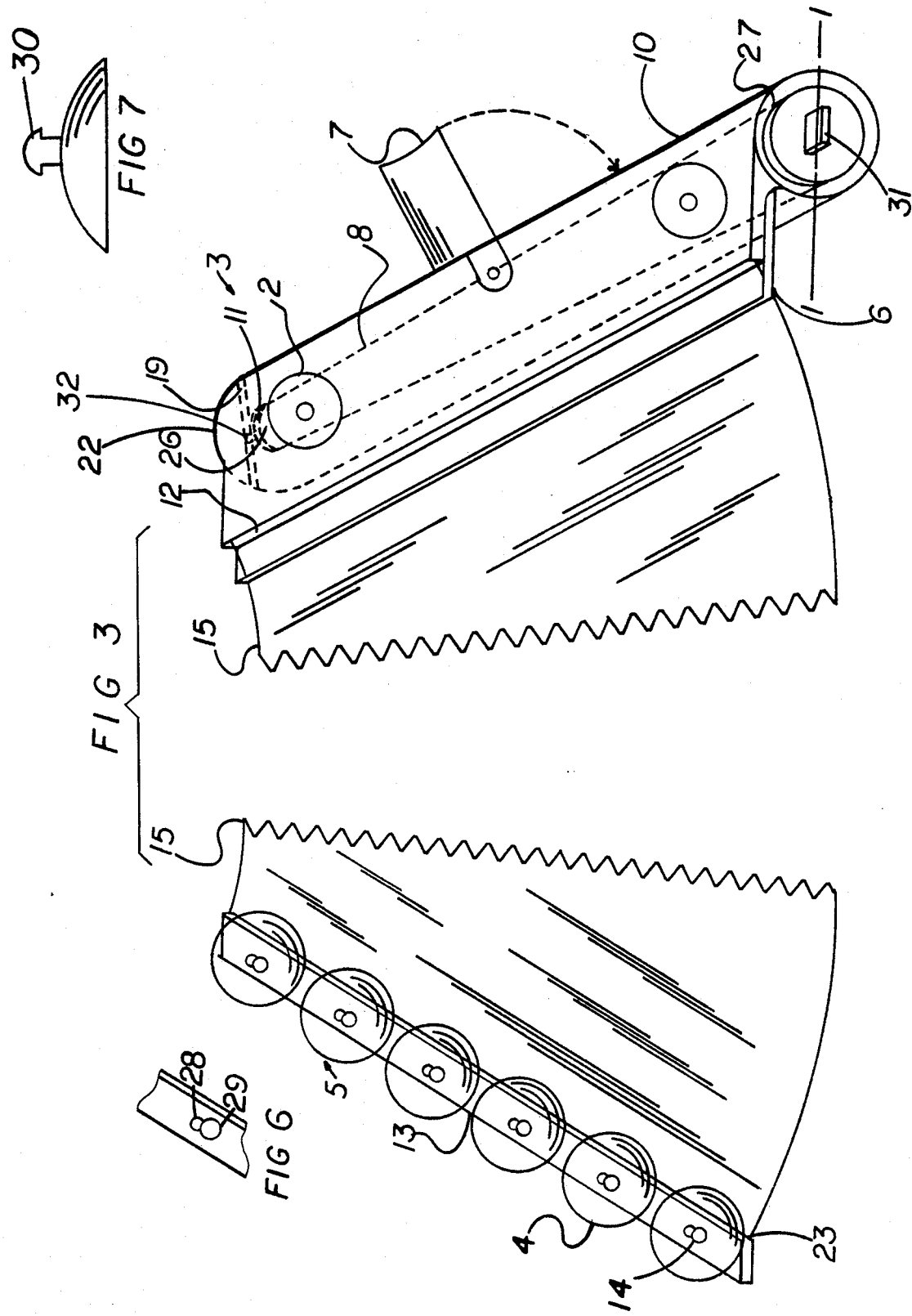

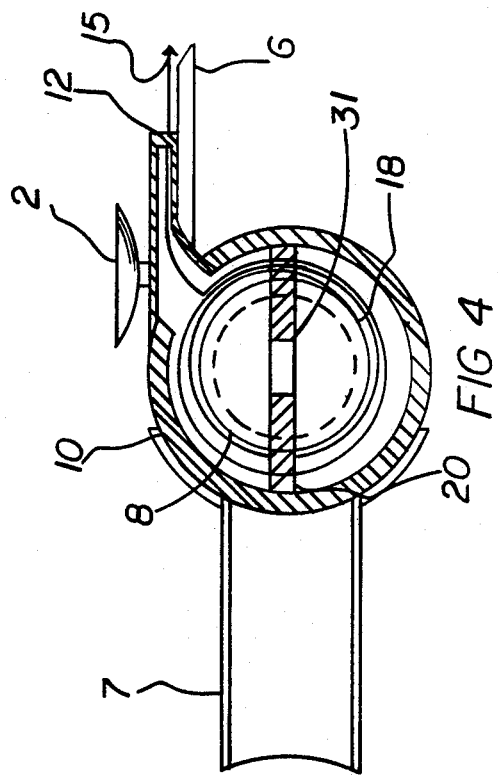
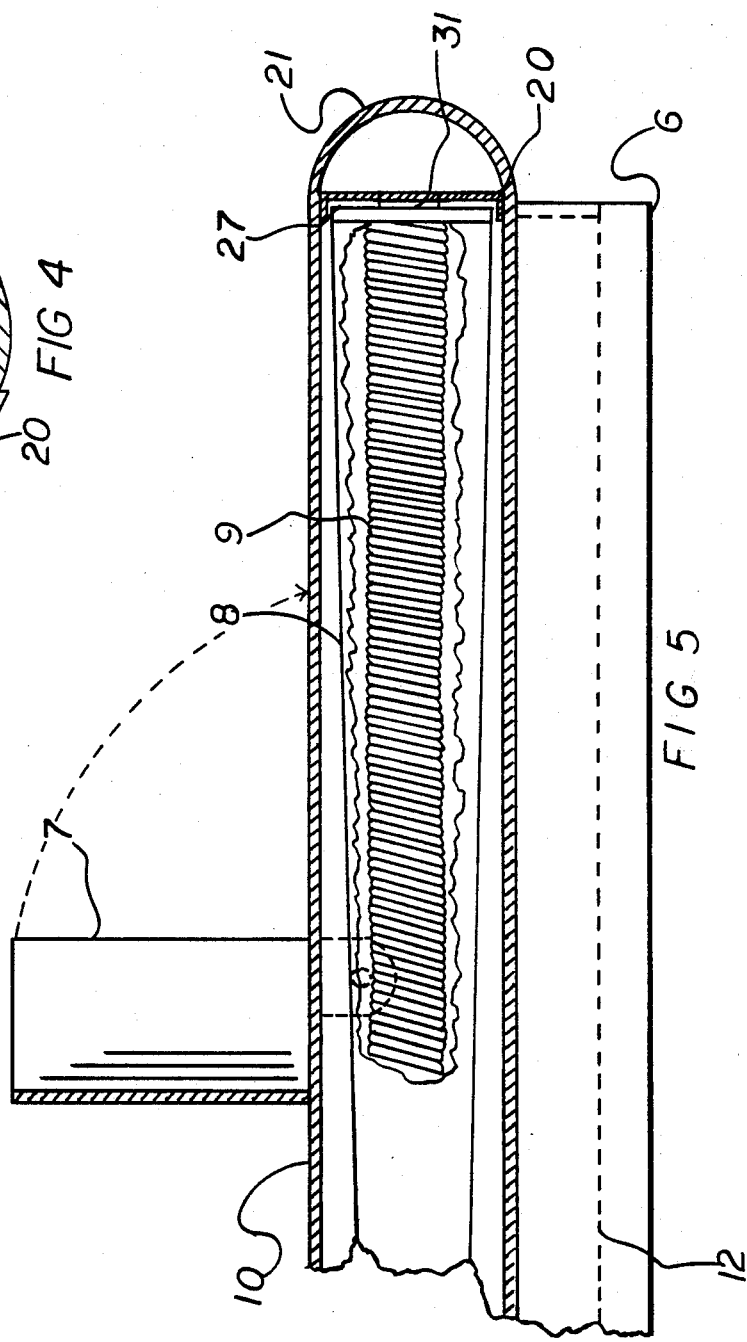

WINDSHIELD PROTECTIVE DEVICE

BACKGROUND OF THE INVENTION

The object of my invention is to provide an easily mountable and retractable shield made of inexpensive construction which will protect the interior of a motor vehicle from the harmful rays of the sun.

Although many attempts have heretofore been made to serve the same function as said invention, the prior art has fallen short of achieving the desired goals of having the protective film cover the entire windshield while also following the curvature of a windshield, due to the redesign of a modern car windshield through the years. A modern car windshield is a curved trapezoid and a rectangular protective film cannot cover the entire windshield from the interior side of the windshield without clumping of the protective film.

It is a further object of the said invention to provide a shield for protecting the interior of a motor vehicle from overheating and fading through constant exposure to the suns rays, comprised of a flexible silver-coated electrostatic vinyl strip or the like, connected to a specifically designed spring loaded conical shaped roller which is encased in a tubular cylinder and intended to be mounted on the front windshield in the interior of a motor vehicle while the vehicle is parked.

Another salient object of said invention is to overcome storage problems which have plagued prior art due to their bulky shape and size. The said invention, by essence of design is constructed to be stored when not in use either mounted on the passager side of the windshield or even placed under the seats.

In order to appreciate the unique design and innovations of the said invention, we must first accept the fact that the windshield of a modern motor vehicle is a curved trapezoid with concave ends and not flat and rectangular in shape and with that fact established, we must also realize a rectangular shaped film cannot be use to fit exactly the contour of a trapezoidal shaped windshield from the interior of the vehicle. Previously constructed arts, which were designed to follow the curvature of the windshield were accomplished by using guide rails which are bulky and expensive to construct and assemble.

Thus, a new and improved design must be constructed to accommodate today's aerodynamically shaped windshield, which I believe this invention does.

DESCRIPTION OF PRIOR ART

U.S. Pat. No. 1,406,499 discloses side curtains for a automobile which are supported from the frame of the top.

U.S. Pat. No. 1,571,019 discloses a rear windshield protective device to protect against glare from headlights of automobiles using a celluloid-gelatin screen.

U.S. Pat. No. 1,621,972 discloses an anti-glare device for a vehicle mounting onto a windshield using a colored celluloid strip attached to a roller and casing.

U.S. Pat. No. 2,851,303 discloses a windshield protective device mounting on the exterior of a vehicle comprised of a protective film in a retractable casing to protect the windshield against snow and ice.

U.S. Pat. No. 3,003,812 discloses a windshield device for a motor vehicle constructed of an opaque material, rectangular in shape with pleats or folds.

U.S. Pat. No. 3,410,601 discloses a windshield protective device mounted exteriorly midway of the windshield with two protective films extending along each side of the windshield to protect against frost, ice and snow.

While these units may be suitable for the particular purpose to which they address, they would not be as suitable for the purpose of the present invention as heretofore described.

SUMMARY OF THE INVENTION

The primary object of the forementioned invention is to provide a sun protective device for a motor vehicle that will overcome the shortcomings of prior art devices.

Another object is to provide a design that is economical to manufacture in material and labor.

Another object is to provide a sun screen which is simple to assemble and use.

An additional object is to provide a sun blocking device removably mounted on the inner surface of a windshield of a motor vehicle which will cover the entire windshield.

A further object is to have the protective film attach itself to the inner surface of the windshield to reduce the "Greenhouse Effect".

A still further object is to have the protective film retractable in order to coincide with the shapes, contour and size of all different windshields of different motor vehicles.

A still another and important object of the said invention is the unprecedented and novel means of encasing a curved trapezoidal electrostatic vinyl film in a cylindrical tubing using a conical shaped spring loaded roller.

All the unique advantages and functions that characterize this invention will become apparent as the drawings and the descriptions of the preferred embodiment are revealed in their entirety.

BRIEF DESCRIPTION OF THE DRAWINGS

The instant invention will be thoroughly described through the drawings where constant references will be made to these drawings in the detailed description segment.

FIG. 1 is a top view of vehicle incorporating a preferred embodiment of this invention.

FIG. 2 is a side view of the vehicle shown in FIG. 1.

FIG. 3 is a detailed isometric diagram of the windshield protective device showing all the various parts and their perspective location with one end cap removed.

FIG. 4 is a side view looking down the top end of the preferred embodiment with the end cap removed.

FIG. 5 is a cross-sectional view taken along line 1—1 of FIG. 3.

FIG. 6 is an enlarge view of a 8-shaped slot.

FIG. 7 is an enlarged view of a suction cup.

DETAILED DESCRIPTION OF THE PREFERRED EMBODIMENT

Many features and innovation of the said invention come clear into view as detail descriptions along with drawings show the advantages in construction and arrangement of parts of the preferred embodiment whereby the desired advantages are attained.

Throughout the drawings, similar reference characters denotes similar elements in the different views; FIG. 1 reveals a top view of a car 16 with the protective windshield device 3 mounted on the interior side of the windshield 17 with the silver-coated electrostatic vinyl film 15 extended along the entire windshield.

FIGS. 3 through 6 illustrates a sun reflecting device 3 consisting of a conical shaped spring loaded roller 8 attached to one end 18 of the electrostatic vinyl film 15, in which the film 15 is trapezoidal in shape and mounted to the conical shape roller 8 by any number of suitable means. The entire roller assembly with the retracted film 15 wound onto the conical shaped spring loaded roller 8 is then encased into a resilient tubular cylinder 10 and stabilized by two support brackets 19 and 20 with two semi-circular end caps 21, 22 affixed to the open ends of the cylinder 10. The free end 23 of the electrostatic vinyl film 15 extends outward from the protruding, elongated slot 12; the free end 23 of the film 15 is then attached to a minor support assembly 5 consisting of a flat support member 13 housing six suction cups 4. This said assembly heretofore known as the "Anchor assembly" is used to secure the loose end 23 of the electrostatic vinyl film 15 on the passenger's side of the windshield 17. The six suction cups 4 are secured onto the flat member 13 through six 8-shaped slots 14. The Anchor assembly 5 is mounted flush onto the inner surface of the windshield 17 on the passenger's side of a motor vehicle 16. The Main tubular housing 10 with elongated rubber strip 6 affixed directly beneath the protruding slot 12 is pressed against the windshield 17 with the protective film 15 situated between the windshield 17 and rubber strip 6; using the pivoting handle 7 located contraposition to the rubber strip 6; pressure is applied to the electrostatic vinyl 15 through the cylindrical housing 10. The Main tubular housing 10 is pulled across the windshield 17, while following the curvature of the windshield 17 and maintaining constant pressure on the windshield 17; leaving the protective film 15 secured, extended and attached to the windshield 17. The housing 10 is then mounted flush onto the drivers side of the windshield 17 by two suction cups 2 located directly above the protruding slot 12. With the protective screen 15 in place, the rays 24 of the sun 25 are deflected therefrom to prevent the interior of the motor vehicle 16 from overheating and the dashboard and seats are protected there in from the harmful rays of the sun. Retraction of the protective film 15 is accomplished by peeling the film 15 off the windshield 17 and letting the film 15 retract into the cylindrical housing 10.

The conical shaped, spring loaded roller 8, consists of a long hollow conical shaped tube made of plastic or the like, with the small end 26 culminated by a circular cap 11 which has a metal pin 32 protruding from the center. The larger opposite end 27 is used to encase the spring loaded system 9 which is of novel construction. The rectangular pin 31 located in the center of the larger end 27 of the conical shaped roller 8 is use to aid in recoiling the spring system 9. The conical shaped roller 8 serves the function of retracting the trapezoidal shaped film 15 evenly whereas the typical cylindrical spring loaded roller would clump the film 15; therefore only a conical shaped roller can be used to retract such a film body 15. The ratio between the two ends 26, 27 of the conical shaped roller 8 varies depending on the curvature of the windshield of the motor vehicle 16 to ensure the film 15 is wound tightly.

The forementioned sun protective device 3 constructed of plastic or the like consists of a tubular cylinder 10 with a protruding slot 12 attached to the cylinder and a flexible rubber strip 6 mounted onto the protruding slot 12, with two suction cups 2 directly above the slot 12 and a pivoting handle 7 contraposition to the rubber pad 6, serving several functions; first to house and protect the electrostatic film 15 when not in use; second through the use of the rubber strip 12, cylinder 10 aid in mounting the sun screen film 15 onto the window 17 with a squeegee-like function.

The electrostatic vinyl film 15 is used as the protective film due to its high coefficient of friction with nonporous materials such as glass and metal. When pressure is applied to the film 15 against the nonporous material; the film 15 will attach itself to that material without the aid an adhesive. The shape of the protective screen 15 is that of a curved trapezoid because the shape of a motor vehicle windshield 17 is a curved trapezoid.

The Anchor assembly 5 has six 8-shaped slots 14 positioned equal-distance from each other along the minor support member 13. The 8-shaped slots consist of a small circle 28 directly above a larger connecting circle 29 as depicted in the drawing FIG. 7. The suction cups 14 equipped with a mushroom-like head 30 are logged through the larger circle 29 then pushed over the smaller circle 28 to insure a secure fit.

Having thus described the invention what is claimed is:

1. A protective device mountable onto a windshield of a motor vehicle to preserve the dashboard and seats from the harmful rays of the sun as well as inhibit the motor vehicle from overheating comprising:
   a. a main tubular support member having a protruding elongated slot with a rubber strip protruding adjacent the protruding slot so that said slot is between said windshield and said strip and having a pivoting handle contrapositioned to the strip across the support member and two suction cups adjacent the slot;
   b. a pair of semi-circular end caps each affixed to one end of the aforementioned tubular support member;
   c. a conical shaped spring loaded roller rotatably mounted within said main tubular support member between said end caps;
   d. a curved generally trapezoidal flexible reflective shade body comprised of an electrostatic vinyl material which is secured at one longitudinal end to said spring roller with the other longitudinal end extending outwardly from said slot in said main tubular support member;
   e. a minor flat support member secured to the other end of said shade body for being mounted on one lateral side of said windshield;
   f. said spring roller incuding means for retracting said body into said support member; and
   g. means for securing the said main tubular support member to the other lateral side of said windshield after said tubular support member is drawn across said windshield while said rubber strip presses said shade body against the inner surface of said windshield.

2. The protective device as recited in claim 1 wherein said tubular support member includes means to store and protect the retracted trapozoidal shade body and said rubber strip comprises means to mount the protective shade body as the latter is withdrawn through said slot.

3. The protective device as recited in claim 2 in which said minor support member includes keyhole shaped holes spaced along said minor support member and six suction cups to secure the loose end of the shade body on the said one side of the windshield.

4. A sun shade device for vehicle windshields comprising:
   a. housing means for being mounted on the inside of a windshield adjacent one lateral end of said windshield along one side of said vehicle;
   b. conically shaped roller means mounted within said housing means with the larger diameter of said roller means being located at the bottom side of said windshield;
   c. a sheet of protective shade mounted on said roller, said protective shade being made from an electrostatic vinyl sheet material;
   d. slot means in said housing means to permit said shade to be unrolled from said roller means;
   e. means attached to the end of said shade protruding from said slot and being mounted on the other lateral end of said windshield to pull said shade off said roller means as said housing means is moved across said windshield; and
   f. means mounted on said housing meand adjacent said slot to force contact of said shade with said windshield as said shade is being withdrawn so that said shade will be in contact with said windshield over the full length of said windshield, said shade being trapezoidal in shape to fit on said conically shaped roller means and to fit said windshield after said shade is extended.

5. The sun shade device of claim 4 wherein said housing means includes spring means to retract said shade.

6. The sun shade device of claim 4 wherein said means mounted on said housing means adjacent said slot comprises a rubber strip whereupon pressing of said strip against said shade as the latter is being pulled from said housing means causes said shade to make contact with said windshield which is maintained over the length of said windshield due to adherent characteristics of the sheet material.

* * * * *